(12) United States Patent
Myers, Jr. et al.

(10) Patent No.: US 7,752,144 B1
(45) Date of Patent: Jul. 6, 2010

(54) MULTI-DISCIPLINARY INFORMATION ENGINE FOR TOTAL OWNERSHIP COST ESTIMATION OF COMPLEX SYSTEMS

(75) Inventors: Kenneth N. Myers, Jr., Manassas, VA (US); Jennie D. Beckley, Herndon, VA (US); Galen P. Plunkett, Manassas, VA (US); Dinesh Verma, Centreville, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/577,039

(22) Filed: May 24, 2000

Related U.S. Application Data (60) Provisional application No. 60/135,491, filed on May 24, 1999.

(51) Int. Cl.
   *G06F 17/00* (2006.01)
   *G06F 17/50* (2006.01)
(52) U.S. Cl. .......................................... 705/400; 705/7
(58) Field of Classification Search ................. 706/45, 706/47, 50; 707/104; 700/83; 705/14, 15, 705/20, 1, 400, 1.1, 7–10; 703/2
   See application file for complete search history.

(56) References Cited

U.S. PATENT DOCUMENTS

| | | | | |
|---|---|---|---|---|
| 4,887,206 | A * | 12/1989 | Natarajan | 705/29 |
| 5,249,120 | A * | 9/1993 | Foley | 705/1.1 |
| 5,406,477 | A * | 4/1995 | Harhen | 705/7 |
| 5,745,880 | A * | 4/1998 | Strothmann | 705/7 |
| 5,765,137 | A * | 6/1998 | Lee | 705/7 |
| 5,793,632 | A * | 8/1998 | Fad et al. | 705/400 |
| 5,963,953 | A * | 10/1999 | Cram et al. | 707/102 |
| 6,219,654 | B1 * | 4/2001 | Ruffin | 705/400 |
| 6,263,255 | B1 * | 7/2001 | Tan et al. | 705/14 |
| 6,295,513 | B1 * | 9/2001 | Thackston | 703/1 |
| 6,349,237 | B1 * | 2/2002 | Koren et al. | 705/7 |
| 6,408,263 | B1 * | 6/2002 | Summers | 705/10 |

(Continued)

FOREIGN PATENT DOCUMENTS

WO    WO 97/31320    * 8/1997

OTHER PUBLICATIONS

Myers et al., "System Design to Affordability in a Collaborative Systems Engineering Environment", 1999, available at http://www.incose.org/se-int/SupportData/MyersVerma1999.doc.*

(Continued)

*Primary Examiner*—Igor Borissov
(74) *Attorney, Agent, or Firm*—Whitham, Curtis, Christofferson & Cook, P.C.

(57) ABSTRACT

A system and method for determining a total ownership cost associated with a complex system (or a component thereof) includes a multi-disciplinary environment including at least one tool, a product data manager, and a total ownership costs assessment tools. The tools in the multi-disciplinary environment are used to gather information regarding the complex system. The product data manager receives the information from the tools and organizes the information as an information model representing the complex system. The total ownership cost assessment tool extracts various system and related scheduling aspects from the information model and determines the total ownership cost associated with the complex system (or the component thereof).

36 Claims, 6 Drawing Sheets

U.S. PATENT DOCUMENTS 6,415,263 B1 * 7/2002 Doss .......................... 705/26

OTHER PUBLICATIONS

Unknown Author, "Availability/Reliability Modeling Software Package", Dec. 17, 2002, availability/reliability/life cycle cost modeling software directory, 6 pages.*

Pradep Raj, Ph.D., "Aircraft Design in the 21st Century: Implications for Design Methods", Nov. 13, 1998, available at www.aoe.vt.edu/research/groups/mad/MAD_Meeting_98/presentations/raj_mad_center_talk.pdf.*

Mark Schaeffer, "Software Engineering and Systems Engineering in the DOD", Oct. 1998, available at www.stsc.hill.af.mil/crosstalk/1998/10/schaeffer.pdf.*

Unknown Author, "The Dimensional and Quality Management" literature, available at http://www.eai.com/software/visepm/dqm/about_visepmdqm.html, www.eai.com/content.html.*

Fenyes et al., "Issues in Industrial Multidisciplinary Optimization", unknown month 1998, 12 pages, available at http://endo.sandia.gov/AIAA_MDOTC/sponsored/Jim_Bennett_GM_ppr.pdf.*

* cited by examiner

MULTI-DISCIPLINARY INFORMATION ENGINE FOR TOTAL OWNERSHIP COST ESTIMATION OF COMPLEX SYSTEMS

CROSS-REFERENCE TO RELATED APPLICATIONS

This application claims priority to a provisional application entitled "Multi-Disciplinary Information Engine for Total Ownership Cost Estimation of Complex Systems," filed on May 24, 1999 and assigned provisional application No. 60/135,491, the entirety of which is incorporated herein by reference.

BACKGROUND

1. Field of the Invention

The present invention relates generally to collaborative systems engineering environments, and more particularly to those that consider cost as an independent variable during a design to affordability process.

2. Discussion of the Related Art

Conventional collaborative multi-disciplinary environments are used in the design, development, production, and support of complex systems. A collaborative multi-disciplinary environment links information from various multi-disciplinary groups involved with various aspects associated with the complex system to form a common information model that represents the complex system. The collaborative multi-disciplinary environment provides discipline specific views of the information model and integrates their tools and processes with a managed repository of information representing the complex system.

The collaborative multi-disciplinary environment is implemented in one or more commercially available software components, also referred to herein as commercial-off-the-shelf products ("COTS"), to manage and leverage various activities among the disciplines involved. Using the collaborative multi-disciplinary environment, the various disciplines contributing to decisions associated with the complex system can exploit a number of synergies that result from timely and reliable exchange of information.

Some conventional environments offer a standalone cost estimation capability that incompletely represents all the of costs associated with the complex system; that do not integrate well, if at all, with other components in the environment; that lack flexibility and scalability; and that are not tightly coupled to the information model associated with the complex system as it evolves during its life cycle.

What is needed is a multi-disciplinary information engine that estimates a total ownership cost of a complex system.

SUMMARY OF THE INVENTION

The present invention is directed toward a system, method, and computer program product that estimates a total ownership cost of a complex system or a component thereof. The present invention includes at least one tool in a multi-disciplinary environment, a product data manager, and a total ownership cost assessment tool. The tools in the multi-disciplinary environment are used to gather information regarding the complex system. The product data manager organizes the information as an information model representing the complex system. The total ownership cost assessment tool extracts various system and related scheduling aspects associated with the complex system, or a component thereof, from the information model and determines the total ownership cost associated with the complex system, or the component.

According to one aspect of the present invention, a method for determining a total ownership cost associated with a complex system comprises receiving an aspect of system context from an information model of the complex system, where the information model is generated by and maintained in a multi-disciplinary environment; receiving an aspect of schedule context from the information model, where the aspect of schedule context is related to the aspect of system context; and determining the total ownership cost of the complex system based on the aspect of system context and the aspect of schedule context.

According to another embodiment of the invention, a computer program product for enabling a processor in a computer system to implement a process for estimating a total ownership cost associated with a complex system comprises a computer usable medium having computer readable program code embodied in said medium for causing a program to execute on the computer system, where the computer readable program code comprises first computer readable program code for enabling the computer system to receive an aspect of system context from an information model of the complex system, wherein the information model is generated by and maintained in a multi-disciplinary environment; second computer readable program code for enabling the computer system to receive an aspect of schedule context from the information model, where the aspect of schedule context is related to the aspect of system context; and third computer readable program code for enabling the computer system to determine the total ownership cost of the complex system based on the aspect of system context and the aspect of schedule context.

According to another embodiment of the invention, a system for determining a total ownership cost associated with a complex system comprises a multi-disciplinary environment including at least one tool used to gather information regarding the complex system; a product data manager coupled to the multi-disciplinary environment, wherein the product data manager organizes the information gathered by the tool as an information model representing the complex system; and a total ownership cost assessment tool coupled to the product data manager to receive an aspect of system context and an aspect of schedule context from the information model, wherein the total ownership cost assessment tool determines the total ownership cost associated with the complex system based on the aspect of system context and the aspect of schedule context, wherein the aspect of system context is related to the aspect of schedule context.

According to another embodiment of the present invention, a method for determining a system life cycle parameter associated with a complex system comprises receiving an aspect of system context from an information model of the complex system, wherein the information model is generated by and maintained in a multi-disciplinary environment, the aspect of system context including at least one of a functional context, a physical context, and a operational context; receiving an aspect of schedule context from the information model, the aspect of schedule context related to said aspect of system context; receiving an aspect of infrastructure context from the information model, the aspect of infrastructure context related to the aspect of system context and the aspect of schedule context; and determining the system life cycle parameter associated with the complex system based on the aspect of system context, the aspect of schedule context, and the aspect of infrastructure context.

According to another embodiment of the present invention, a method for determining a total ownership cost associated with a component of a complex system comprises receiving an aspect of system context from an information model of the complex system, wherein the information model is maintained in a multi-disciplinary environment; receiving an aspect of schedule context from the information model, the aspect of schedule context related to the aspect of system context; and determining the total ownership cost with respect to the aspect of system context and the aspect of schedule context for the component of the complex system.

These and other features and advantages of the present invention will become apparent from the following drawings and description.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

The present invention is directed toward a multi-disciplinary information engine for estimating a total ownership cost of a complex system. While the present invention focuses on and is described in terms of total ownership costs, it should be understood that other parameters could be estimated including product performance assessment, project management, operations concept analysis, sparing, or any other parameter with complex inter-relationships that exist within a multi-disciplinary environment.

System Overview

Figure 1:
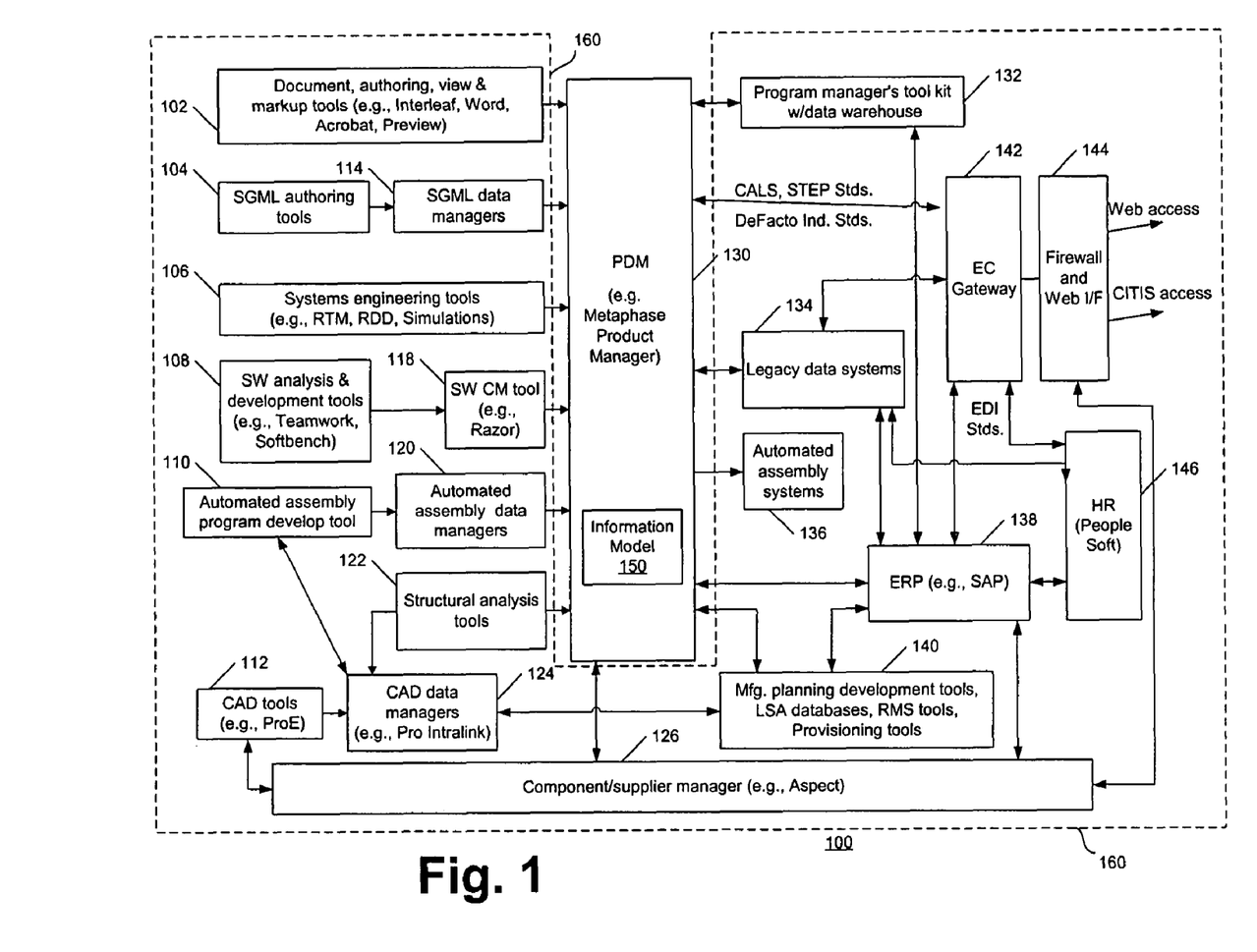
FIG. 1 illustrates an exemplary multi-disciplinary environment.

FIG. 1 illustrates an exemplary multi-disciplinary environment 100 useful for operation with the present invention. Multi-disciplinary environment 100 includes various disciplines, typically existing within an organization, to provide skills, tools, processes, know-how, information, and various other resources on which the organization depends to deliver a project.

According to the present invention, a project is defined as a collection of project phases through which a complex system progresses during a system life cycle from beginning to end. These phases may include a conception phase, a design phase, a development phase, a production phase, a delivery phase, a technology refresh phase, a technology insertion phase, a maintenance phase, a sustaining phase, and a retirement phase. During the system life cycle, various aspects of the complex system may change or evolve to include better technology, additional features, reduction in parts or subsystems, improvements in quality, and/or any other aspects that may occur during the system life cycle. These aspects may include internal factors (i.e., those controlled by the organization) and external factors (i.e., those outside the control of the organization). It should also be understood that a complex system does not necessarily refer to a single device or unit or a collection of devices that operate as a single unit. In one embodiment of the present invention, the complex system within a project may include a schedule of deliverable individual systems. In another embodiment, the complex system may include a schedule of deliverable subsystems that comprises an overall system. In yet another embodiment, the complex system may comprise a schedule of deliverable individual systems along with a schedule of upgrades to various subsystems that comprise the individual systems.

As alluded to above, conventional multi-disciplinary environments do not consider a total ownership cost associated with the project during the life cycle of the complex system. The total ownership cost reflects all the costs incurred by the project that are associated with the complex system during its life cycle. Total ownership costs includes all past, present and future costs associated with all aspects of the complex system as will be described below.

Multi-Disciplinary Environment

Multi-disciplinary environments, such as multi-disciplinary environment 100 of FIG. 1, were developed to manage and organize information associated the project or, in other words, with the design, development, production, and support of a complex system. Within multi-disciplinary environment 100 various disciplines are represented. These disciplines include engineering, manufacturing, quality assurance, assembly and test, project management, human resources, procurement, and other organizational functions associated with the project as would be apparent. Multi-disciplinary environment 100 includes various tools and processes associated with each of the relevant disciplines. Multi-disciplinary environment 100 also includes a product data manager ("PDM") 130 interfaced to each of these tools and processes. PDM 130 gathers information from each of these tools and processes and organizes the gathered information as an information model 150. Information model 150 represents the organization's collective knowledge associated with the project throughout its life cycle.

As illustrated in FIG. 1, multi-disciplinary environment 100 includes various tools and processes 160 (illustrated as tools and processes 102, 104, 106, 108, 110, 112, 114, 118, 120, 122, 124, 126, 132, 134, 136, 138, 140, 124, 144, 146). Tools and processes 160 include one or more of document, authoring, view and markup tools (e.g., Interleaf, Word, Acrobat, Preview) 102, SGML authoring tools 104, systems engineering tools (e.g., RTM, RDD, simulation) 106, software analysis and development tools (e.g., Teamwork, Softbench) 108, automated assembly program development tools 110, CAD tools (e.g., ProE) 112, SGML data managers 114, software configuration management tools (e.g., razor) 118, automated assembly data managers 120, structural analysis tools 122, CAD data managers (e.g. Pro Intralink) 124, component/supplier managers (e.g., Aspect) 126, program manager's tool kit with data warehouse 132, legacy data systems 134, automated assembly systems 136, enterprise resource planning (ERP, e.g., SAP) 138, manufacturing planning development tools, logistics support analysis data bases, reliability, maintainability, supportability tools, and provisioning tools 140, electronic commerce gateway 142, firewall and web interface 144, and human resources (PeopleSoft) 14.

According to the present invention, multi-disciplinary environment 100 may include one or more of the tools and processes 160 illustrated in FIG. 1 as would be apparent. For example, organizations providing software systems may not have need for CAD tools 112 or structural analysis tools 122. Likewise, various embodiments of multi-disciplinary environment 100 may include additional tools and processes 160 not illustrated in FIG. 1.

Total Ownership Cost Assessment Tool

Figure 2:
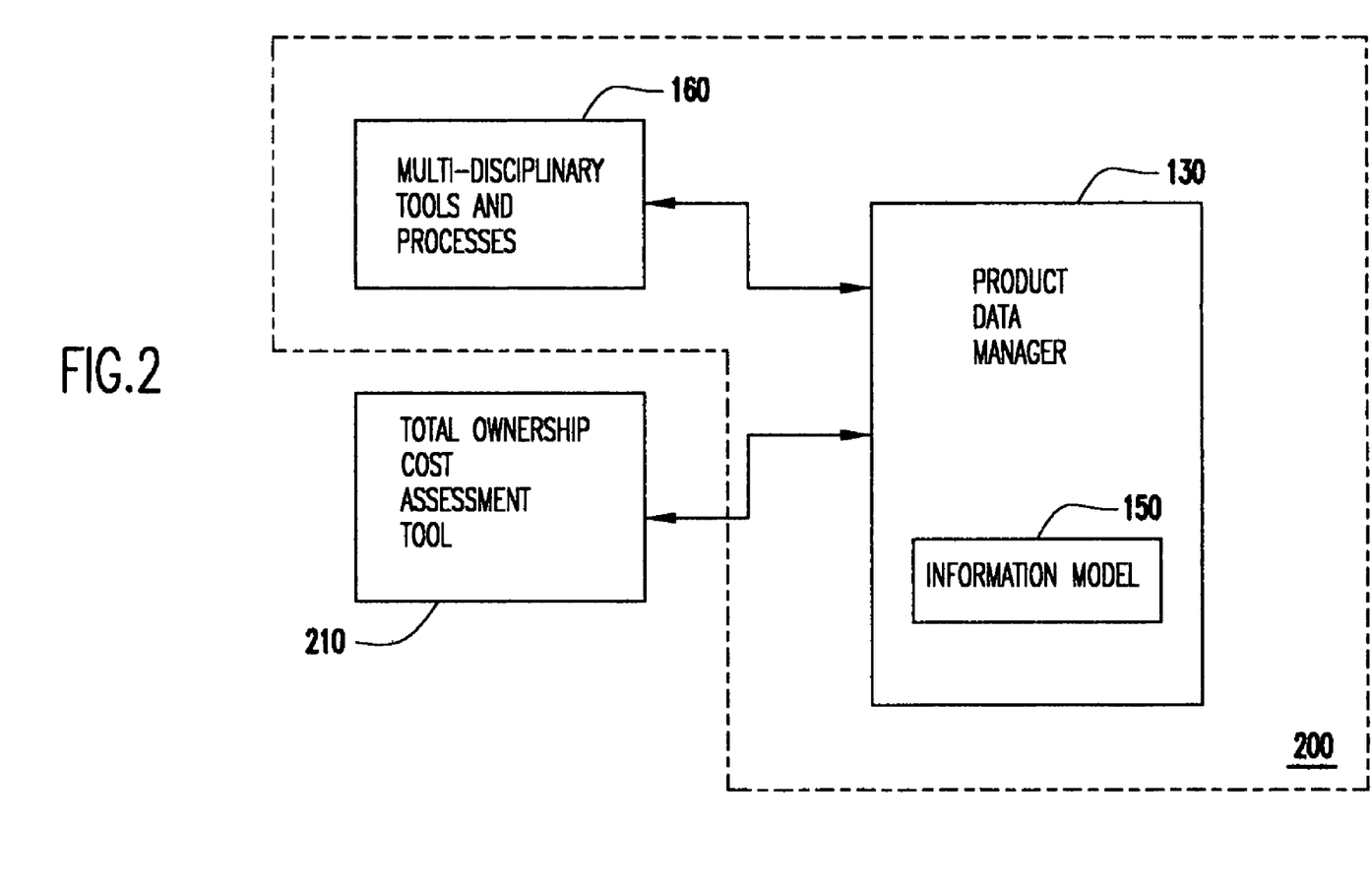
FIG. 2 illustrates a multi-disciplinary environment according to one embodiment of the present invention.

FIG. 2 illustrates a multi-disciplinary environment 200 and a total ownership cost assessment tool 210 in accordance with the present invention. As illustrated in FIG. 2, multi-disciplinary environment 200 includes one or more tools and processes 160 interfaced to PDM 130 including information model 150 representing the project for the complex system. Total ownership cost assessment tool 210 is also interfaced to PDM 130. Total ownership cost assessment tool 210 uses information extracted from or provided by PDM 130 regarding information model 150 to determine a total ownership cost associated with the project.

Total Ownership Costs

Figure 3:
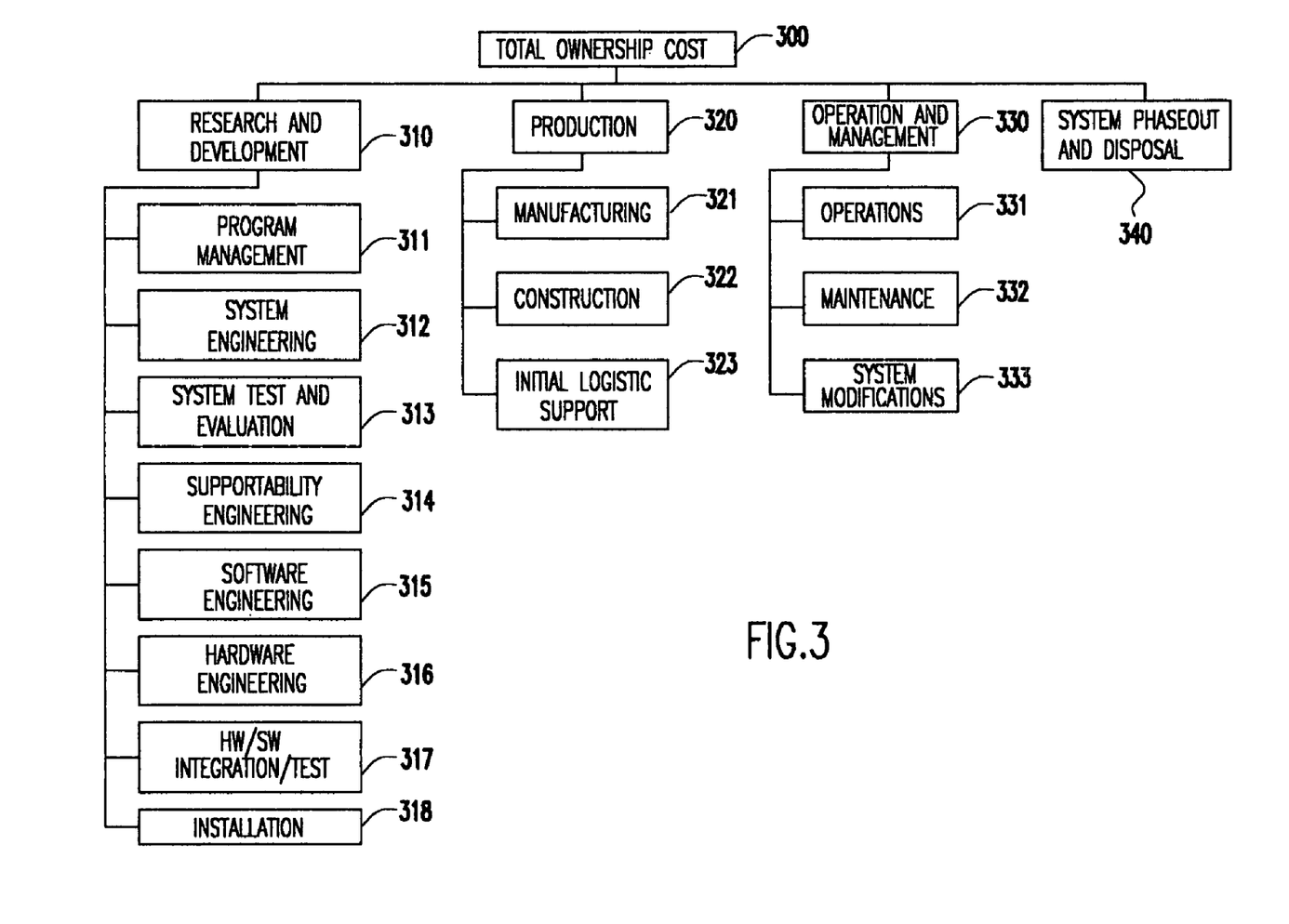
FIG. 3 illustrates a breakdown of total ownership costs according to one embodiment of the present invention.

FIG. 3 illustrates a breakdown of a total ownership cost 300 in further detail. Total ownership cost 300 includes research and development costs 310, production costs 320, operations and management costs 330 and system phase-out and disposal costs 340. Each of these costs is described in further detail below.

Research and Development Costs

Research and development costs 310 include program management costs 311, system engineering costs 312, system test and evaluation costs 313, supportability costs 314, software engineering costs 315, hardware engineering costs 316, hardware and software integration and test 317, and installation costs 318. Each of these is described in further detail below.

Program management costs 311 include those costs associated with "design to affordability"; risk and schedule management; cost and finance management; contract management; and subcontract management.

System engineering costs 312 include those costs associated with system engineering; system requirements architecture, functional analysis and interface definition; program plans (SEMP, SDP, TIP, etc.); systems modeling and simulation; technology refreshment strategy; reliability, maintainability, and supportability analysis and modeling; human factors; operability, security, and safety analysis and modeling; system engineering management; high level design documentation (SSDD); and producibility analysis.

System test and evaluation costs 313 include those costs associated with engineering models; test and evaluation planning; and test procedures and test execution.

Supportability engineering costs 314 include those costs associated with maintenance concept development; COTS assessment and selection; market and standards surveillance; maintenance planning; technical documentation (Interactive Electronic Training Manual); supply support planning and execution; support and test equipment; training development and support; integrated logistics support program management; computer resources support; bay support, maintenance, and security; LAN management; engineering support to government furnished property; and prototype lab engineering.

Software engineering costs 315 include those costs associated with SRS development; software development; software integration and test; software technical management; software quality assurance, control, and technical support; COTS software assessment and selection; and COTS software standards and profiles.

Hardware engineering costs 316 include those costs associated with hardware technical management; HRS development; operations support; electrical engineering; mechanical engineering; safety/electromagnetic interference/power; environmental/environment quality test; functional specifications/design/factory acceptance test; hardware assembly, quality control and test; hardware procurement and R&I.

Hardware and software integration and test costs 317 include those costs associated with software integration and test hardware, software integration and test software, TBPP/SIP updates, hardware and software integration and test, test procedures, GFP acceptance, system SDCT, technology refresh, factory acceptance test, and hardware update, and post installation maintenance/support.

Production Costs

Production costs 320 include manufacturing costs 321, construction costs 322, and initial logistic support 323. Each of these costs is described below.

Manufacturing costs 321 includes non-recurring manufacturing costs and recurring manufacturing costs. Non-recurring manufacturing costs include those costs associated with manufacturing engineering; tools and factoring test equipment; quality assurance; manufacturing management; and qualification testing. Recurring manufacturing costs include those costs associated with manufacturing engineering; fabrication and assembly; material and inventory control; inspection and test; and packing and shipping.

Construction costs 322 include those costs associated with manufacturing and test facilities; and operations and maintenance facilities.

Initial logistics support 323 include those costs associated with program management; provisioning; initial spare/repair parts; initial inventory management; technical data preparation; initial training and training equipment; test and support equipment acquisition; and first destination transportation.

Operations and Management Costs

Operations and management costs 330 include operations costs 331, maintenance costs 332, and system modifications costs 333. Each of these costs are described below.

Operations costs 331 include those costs associated with operating personnel; operator training; operational facilities; and support and handling equipment.

Maintenance costs 332 include those costs associated with maintenance personnel and support at the O/I/D level and the supplier level; spare/repair parts at the O/I/D level and the supplier level; test and support equipment maintenance; transportation and handling; maintenance training; maintenance facilities; technical data; failure analysis; depot; and overhaul and repair.

System modifications costs 333 include those costs associated with RDT&E; technology refreshment; technology insertion; PTR resolution; and SMF/ITMF.

System Phase-Out and Disposal Costs

System phase-out and disposal costs 340 include costs associated with phasing out the project including any necessary disposal cost.

Cost Estimating Engine

Figure 4:
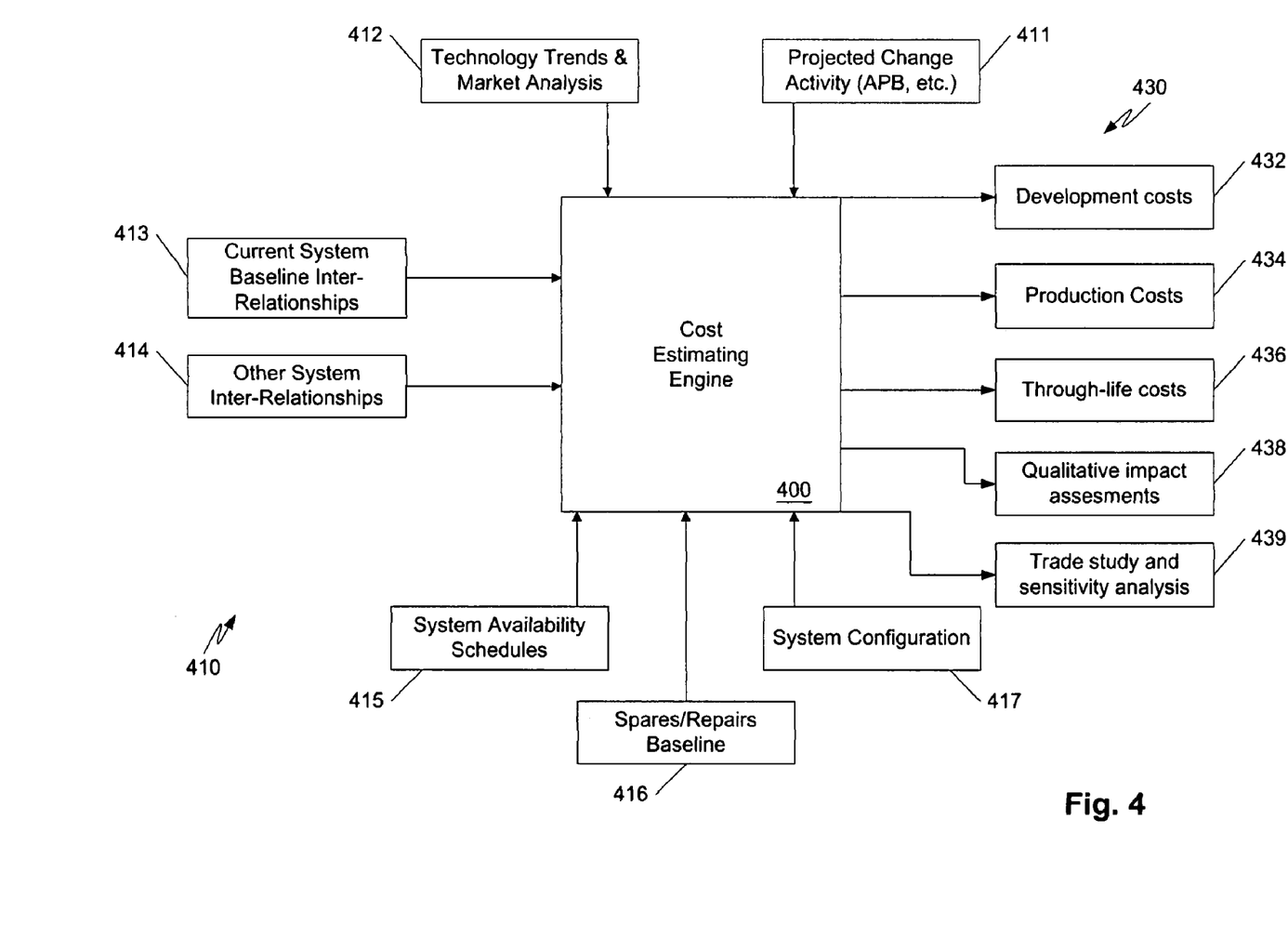
FIG. 4 illustrates an ownership cost assessment tool according to one embodiment of the present invention.

FIG. 4 illustrates a block diagram of total ownership cost assessment tool 210 including a cost estimating engine 400 in further detail. Through various interfaces with PDM 130, total ownership cost assessment tool 210 extracts information regarding the project for the complex system represented by information model 150 and provides this information to cost estimating engine 400. This information is referred to herein as cost estimation inputs 410. Cost estimating engine 400 includes various estimating relationships and heuristics to evaluate cost estimating inputs 410 and provide various cost estimation outputs 430.

Cost Estimation Inputs

Cost estimation inputs 410 includes one or more of projected change activity 411, technology trends and market analysis 412, current system baseline inter-relationships 413, other system inter-relationships 414, system availability schedules 415, spares/repairs baseline 416, and/or system configuration 417. Each of these is described in further detail.

Projected Change Activity

Projected change activity 411 includes various changes included in information model 150. Typically, these changes are anticipated and projected to occur during the system life cycle of the project. Examples of these changes may include functional enhancements to the system or insertion of newly advanced technologies. Preferably, these changes are scheduled to occur at various times within the system life cycle. Within multi-disciplinary environment 100, the tools that provide this type of information to PDM 130 for information model 150 may include systems engineering tools 106, software analysis and development tools 108, CAD data managers 124, manufacturing planning development tools 140, ERP 138, legacy data systems 134, and program managers toolkit 132.

Technology Trends and Market Analysis

Technology trends and market analysis 412 include various costs curves included in information model 150. These cost curves may include technology costs curves. Typically, these technology cost curves are established from historical data and represent projections of the relationship between the cost associated with a technology performance parameter over time. For example, one technology cost curve may represent the cost of processing power over time expressed in dollars per MIP (millions of instructions per second). Another technology cost curve may represent the cost of memory over time expressed in dollars per megabyte. These two curves represent two generally well-known and accepted costs projections based on the historical observation that technology performance grows and the associated costs decline exponentially over time. Similarly, at a particular point in time, computer-related product costs vary linearly with respect to performance and complexity (e.g., a computer with twice the performance of another computer costs twice as much as the other computer). Other similar curves exist for various technologies as would be apparent.

Other cost curves may be generated using generally accepted inflation-driven cost indices such as a price performance index (PPI) or a metal fabrication cost index (DRI). The PPI is used to project labor and material costs components associated with information model 150. The PPI is used to project costs associated with general system complexity, assembly and administrative costs, and non-volatile material costs. The DRI is used to project non-electronic fabrication costs and manufacturing costs.

Other cost curves may be determined with respect to specific subcontractor costs projections. Other cost curves may be determined based on whether the component is a custom design as opposed to a high volume commercial products, or whether the component can be purchased in numbers sufficient to realize quantity discounts.

One example of a cost projection function is provided herein. While others may be used by the present invention, the following cost projection is used in one embodiment of the present invention and is represented by:

$$F_c = \left[\sum_{tech} w_{tech} \times 2^{\frac{-t}{Di_{tech}}} \left(\frac{Perf_{tech}}{RefPerf_{tech}}\right) + \sum_i w_i T_i \left(\frac{C_i}{RefC_i}\right)\right] * BaseCost_{ref}$$

where:
$F_c$ is product cost at time t relative to reference product cost at reference time tech technology-driven product cost components (processor, memory, I/O, storage, etc.)
i inflation-driven product cost component, e.g.: PPI, DRI
$w_{tech}$ fraction of product cost relative to technology-driven cost component at time $t_{tech}$
$RefPerf_{tech}$ performance of reference product relative to $w_{tech}$
$Perf_{tech}$ performance of object product at time $t_o$
$w_i$ Fraction of product cost relative to inflation-driven cost components (for reference product)
$RefC_i$ relative complexity of inflation-driven cost component $w_i$
Ci complexity of object product at time $t_i$ relative to RefCi number of time units between reference product quote and object time
$Di_{tech}$ doubling (halving) interval of cost component
$r_I$ inflation rate for component I
$BaseCost_{ref}$ Reference cost for the product at reference time.

Preferably, these costs curves are built into information model so that the costs of various components can be evaluated at any point throughout the system life cycle.

Within multi-disciplinary environment 100, the tools that provide this type of information to PDM 130 for information model 150 include customized PDM 130, information model 150, ERP 138, and legacy data systems 134.

Current System Baseline Inter-Relationships

Current system baseline inter-relationships 413 represent various operational, functional physical, infrastructure, and scheduling relationships that exist among various aspects of the complex system represented within information model 150 for a particular system baseline. A baseline represents a snapshot in time of a particular configuration of the complex system. Analogies include a version number associated with a software release (e.g., Windows™ 95 4.00.950B). A baseline is established during the system life cycle when various parameters in information model 150 are decided, agreed upon, fixed, or otherwise established. Often, multiple baselines may be established during the system life cycle.

Within information model 150 are various contexts including a functional context, a physical context, an operational context, an infrastructure context, and a schedule context. Functional context represents the functional aspects associated with information model 150. Functional context represents an articulation of the performance specifications associated with the complex system. Functional context represents what the complex system must do and at what level of performance. Functional context preferably includes a mapping to one or more of the other contexts of its evolution through the system life cycle.

Physical context represents the physical aspects associated with information model 150. Physical context represents a physical packaging concept (both in terms of hardware and software) that embodies the complex system. Physical context includes the various devices, components, subsystems, software modules, etc., that implement the functional context. Preferably, physical context includes a mapping to the functional context described above. Physical context may also include a mapping to one or more of the other contexts of its evolution through the system life cycle.

Operational context represents the manner in which the complex system is utilized and maintained. Preferably, the functional and physical contexts are mapped to the operational context. Operational context may also include a mapping to one or more of the other contexts of its evolution through the system life cycle.

Infrastructure context represents the supporting assets required to produce, integrate, support, sustain, and retire the complex system. Availability of these assets is described in a mapping to the schedule context. Infrastructure context may also be mapped to one or more of the other contexts of its evolution through the system life cycle.

Schedule context represents the various scheduling embodied into information model 150. For example, schedule context may include design schedules, delivery schedules, maintenance schedules, technology refresh schedules, etc., and as otherwise described herein. Scheduling context is mapped to the other contexts to provide a timeline of their respective evolutions through the system life cycle.

As will be appreciated, relationships among the functional context, physical context, operational context, infrastructure context, and schedule context may exist. For example, changes to the functional context may or may not require changes to the physical context and vice versa. Similarly, changes to the functional context may or may not require changes to either of the physical context or the functional context and vice versa. These, and other, inter-relationships are provided to cost estimating engine 400 as current system baseline inter-relationships through the so-called "mapping."

Other System Inter-Relationships

Other system inter-relationships 414 include interfaces to external systems, infrastructure resources, etc., that are not otherwise integral to the complex system itself. These other system inter-relationships describe the complex system's interaction with its operating environment.

System Availability Schedules

System availability schedules 415 represent various delivery schedules associated with the complex system. This may include dates for the actual delivery of one of the complex systems in the project or may include dates for delivery of one or more subsystems, retrofits, technology refreshments, etc. This may also include the availability of a larger system within which the complex system must be installed and/or to which the complex system must be attached (e.g., a combat system on a ship).

Spares/Repairs Baseline

Spares/repairs baseline 416 represent various scheduling of sparing and repairing timing associated with the complex system. Various projections are made to estimate when various spare parts will be needed on hand as well as when other parts may require repair. This is accomplished using a stochastic modeling process of spare demand rates based on failure modes and their associated failure distributions for each of the components in the complex system. The modeling is used to ascertain what components will be required at what time during the system life cycle to provide a particular level of system reliability (e.g. MTBF, etc.).

This modeling may be dovetailed with technology and standards surveillance system and a multi-attribute decision making model for COTS assessment and selection. Important variables to this process include concept of operations, readiness requirements, procurement lead times, warranties/data rights, cost, reliability distribution, sources/vendors, function/performance allocations, maintenance support agreements, update on system usage/field data, technology maturity and technology refresh strategy/schedule. Preferably, each of these variables is captured by information model 150 during the system life cycle.

Spare components may be additional components purchased beyond those required for the complex systems in the project. Spare components may also be components that have been replaced during technology refresh and are available for remaining systems with similar configurations.

Sparing and repairing schedules may also be integral with a technology refreshment strategy associated with information model 150. A technology refreshment strategy involves a schedule for when particular components are upgraded during the system life cycle. For example, a technology strategy may be implemented for upgrading a computer processor at various points during the system life cycle. This may include a progression from a Intel 486 processor through one or upgrades to a Intel Pentium III-based processor. These upgrades will have an impact on sparing and repairing as well as on system performance.

In a preferred embodiment, sparing and repairing estimation is accomplished using Clockwork Group's SPAR® to predict and analyze the time dependant allocation and provisioning of spare/repair parts. Integration of the SPAR modeling tool integrates supportability engineering and logistics planning with information model 150 and enables the insertion of consistent provisioning information therein.

SPAR is a COTS modeling tool for predicting and analyzing the life-cycle behavior of systems SPAR uses information about the components making up the system (reliability and cost), the intended use of the system (including variations in the production level), and its support infrastructure (frequency of maintenance, availability of resources) to predict its behavior. Monte Carlo probabilistic simulation techniques are utilized to model the behavior of complex systems, handling such phenomena as uncertain and incomplete data, component aging and maintenance, spare parts, variable demands on the system, and component interactions. Outputs include an optimized time dependent allocation of spare parts consistent with system operational concepts, functional and performance allocations, and physical design. These are utilized to determine the cost of spares and repairs for the system under consideration.

System Configuration

System configuration 417 captures an actual or projected baseline of a particular complex system during the project. During the course of the project various ones of the complex systems are most likely to be completely different in terms of their respective components and subsystems but will be largely similar in their overall design. Thus, in order to properly evaluate total ownership cost of the complex system, the configuration of the particular complex system or systems must be retrieved from information model 150.

Cost Estimation Outputs

Cost estimation outputs 430 include development costs 432, production costs 434, through-life costs 436, qualitative impact assessments 438, and trade study and sensitivity analyses 439. Each of the outputs 432, 434, and 436 represents a breakout with respect to a particular aspect of the total ownership cost 300. Each of cost estimation outputs 430 are described in further detail below.

Development, Production and Through-Life Costs

Development costs 431, production costs 432, and through-life costs 433 represent various components of total ownership cost 300. These components of total ownership costs represent a particular aspect of the cost of the complex system throughout its system life cycle. Development costs 431 represent the cost to develop the complex system. Production costs 432 represent the cost to produce each individual one of the complex systems in the project. Through-life costs 436 represent the cost to support and sustain each individual one of the complex systems through retirement. Preferably, these costs may be expressed in past, present or future dollars at various points in time during the system life cycle.

Qualitative Impact Assessments

Qualitative impact assessments 438 represent an indication of impact to costs for various aspects of the complex system where a qualitative relationship is undefined or otherwise unavailable. Such an indication may provide a "high," "medium," or "low" impact of the particular aspect on cost.

Trade Study and Sensitivity Analyses

Trade Study and sensitivity analyses 439 provide users with a quantitative indication of how a change to an aspect of the complex system (e.g., design, performance, schedule, technology refresh, etc.) will impact total ownership costs 300.

In one embodiment of the present invention, total ownership cost assessment tool 210 and product data manager 130 facilitate a comparison of two complex systems, for example, a baseline system and a baseline system with a changed aspect. In this case, cost estimating engine 400 provides a delta cost quantity indicating a cost increase or decrease associated with the changed aspect.

In another embodiment of the present invention, cost estimating engine 400 determines a sensitivity analysis. The sensitivity analysis determines how sensitive total ownership cost 300 is with respect to a change in a particular aspect of the complex system. The sensitivity analysis aids in identifying those aspects of the complex system that have a critical impact on total ownership cost as well as those with little or no impact so that organizational resources may be allocated accordingly.

In another embodiment of the present invention, cost estimating engine 400 provides trade studies with respect to the complex system. This is particularly useful for determining how a change in one aspect of the complex system, (e.g., performance, schedule, technology refreshment) has another aspect of the complex system, preferably, total ownership cost 300. This is also useful for identifying payback periods, return on investment, and rollover points used in selection of a desired change.

Operation of Cost Estimating Engine

Cost estimating engine 400 receives inputs 410 and provides outputs 430 in order to determine a total ownership cost for the complex system. Via inputs 410, cost estimating engine 400 extracts information from associated system contexts (i.e., functional context, physical context, and operational context), system schedules (i.e., development, production, technology refreshment, support, and system availability), and infrastructure (i.e., development, production, and support). The extracted information is processed through cost estimating relationships and heuristics corresponding to components of total ownership cost 300 and summarized to generate cost estimation outputs 430.

A complete total ownership cost 300 computation represents a summarization of all constituent cost breakdown elements including those of research and development costs 310, production costs 320, operations and management costs 330 and system phase-out costs 340 presented as cost estimation outputs 430. In various embodiments of the present invention, cost estimation outputs 430 comprise the summarization of a selected subset of the constituent elements of total ownership costs 300 (e.g., development cost 310, one or more of the components of development cost 310, or any subset of the components from among costs 310-340).

According to the present invention, information associated with a particular aspect of a complex system is extracted from information model 150. This extracted information includes at least one of the system contexts and an associated scheduling context associated with the particular aspect of the complex system. Costs associated with the extracted information may be obtained based on actual information, calculated based on projected information, or otherwise determined using various cost estimating heuristics.

As described above, these costs are referenced to system context as well as to scheduling context. Thus, these costs are expressed in terms of time, preferably over the system life cycle. Using well known accounting and finance operations, these costs may be expressed as a present value (i.e., today's dollars), as a future value (i.e., in terms of dollars at a particular point in time in the future), or as a past value (i.e., in terms of dollars at a particular point in time in the past).

For example, suppose six complex systems are to be delivered, one at the end of each consecutive year. To greatly simplify the explanation, suppose each of those systems includes a processor. The total ownership cost associated with the processor is determined by estimating the cost of each processor at the time it is procured. Any and all other costs associated with or attributed to the processor are also determined resulting in a stream of costs occurring at various points in time during the system life cycle. Once determined, the cost stream may be expressed as a total cost at a particular point in time (i.e., present value, future value, etc.). In this example, this expression is referred to as a total ownership cost associated with the processor.

Figure 6:
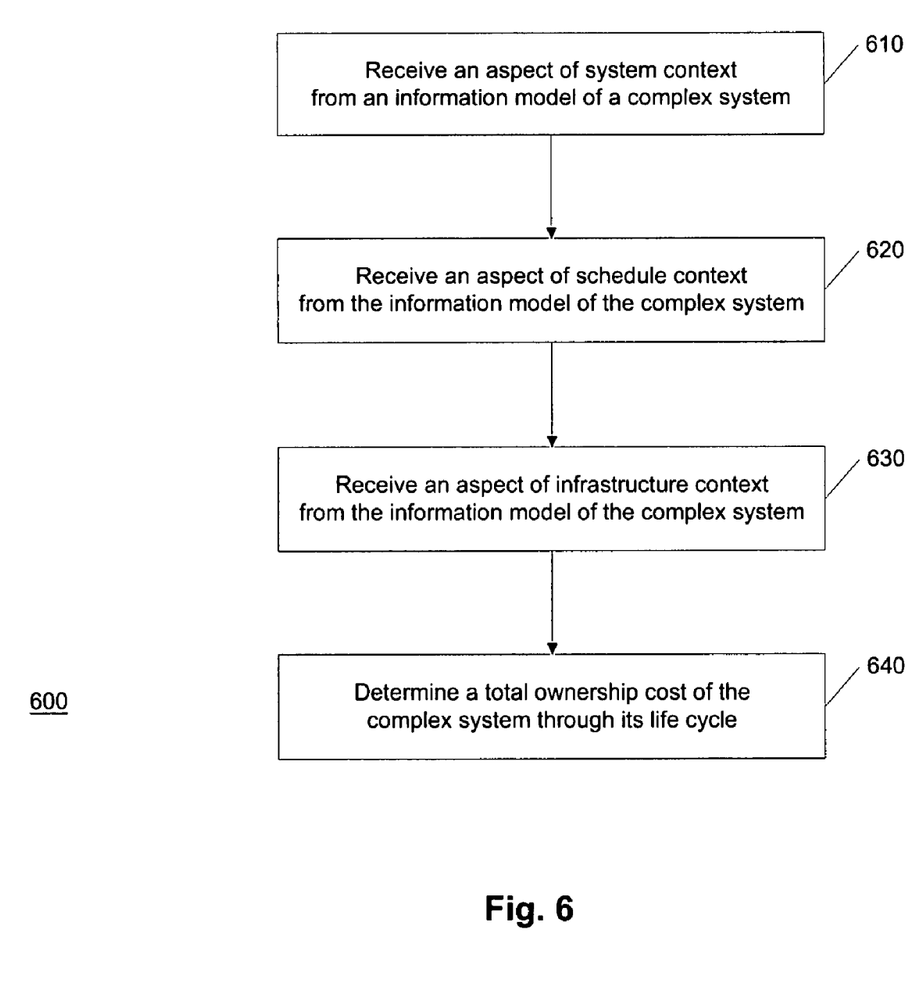
FIG. 6 illustrates an operation of cost estimating engine according to the present invention.

FIG. 6 illustrates an operation 600 of cost estimating engine according to one embodiment of the present invention. In a step 610, cost estimating engine 400 receives at least one aspect of a system context from product data manager 130 and embodied in information model 150 for a complex system. In a step 620, cost estimating engine 400 receives at least one aspect of a schedule context from product data manager 130 and embodied in information model 150. The aspect of the schedule context is preferably somewhat related to the aspect of the system context.

In a step 630, cost estimating engine 400 may receive at least one aspect of an infrastructure context from product data manager 130 and embodied in information model 150. The aspect of the infrastructure context is preferably somewhat related to either the aspect of the system context or the aspect of the schedule context.

In a step 640, using cost information from information model 150 and/or one or more costs projection functions or heuristics, cost estimating engine 400 determines a total ownership cost 300 associated with the complex system through the system life cycle. In one embodiment of the present invention, in step 640, cost estimating engine determines a component of total ownership cost 300.

In an alternate embodiment of the present invention, cost estimating engine 400 provides a qualitative indication of the costs associated with the complex system in the absence of cost information or appropriate cost projections, functions, or heuristics.

In one embodiment of the present invention, cost estimating engine 400 determines one or more system life cycle parameters: 1) hardware procurement cost by configuration; 2) hardware spares/repairs costs by configuration; 3) difference between two configurations for either of the previous; and 4) total ownership cost for the complex system through its life cycle.

Hardware procurement cost by configuration computes the projected cost of a full configuration of hardware elements at a specified point in time. Projected costs for lower level elements of the configuration such as subsystems and assemblies may also be generated.

Hardware spares/repairs cost by configuration computes the cost of spares and repairs required to support the configuration for a specified period of time. This supports the cost assessment of various provisioning strategies. As with the hardware procurement cost by configuration use case, projected costs for lower elements may also be generated.

Differences between two configurations for either hardware procurement costs or hardware spares/repairs may be computed. The costing differences between two configurations or their comparable lower level elements are computed. This capability provides the atomic functionality to support the analysis of tradeoffs between two candidate configurations.

Total ownership cost categorizes the life cycle costs into one or more components and preferably, produces a ranking to identify those elements driving the life cycle cost. Other similar parameters may also be determined. For example, any of costs 310-340 (or the components thereof) may be estimated for any aspect of the complex system over the system life cycle.

Cost as an Independent Variable

Application of system engineering principles must contend with increasing emphasis on assessing projects and conducting design trade studies from a system life cycle perspective. This emphasis is driving an increased utilization of commercial-off-the-shelf ("COTS") products in the development of complex systems. While this emphasis on COTS products has resulted in substantial and relatively immediate system development and production costs on selected systems, the focus of general systems engineering principles must reside on the useful and operational life of the complex system, where a majority of the total ownership costs reside. A cost as an independent variable ("CAIV") methodology focuses on these costs. Consistent with this methodology, all COTS selections for inclusion within the complex system, the technology refreshment strategy, and the system supportability strategy must be rationalized within the framework of the goals and objectives established as part of the CAN implementation. Furthermore, all design trade studies and the baseline change review process preferably includes an explicit focus on the total ownership cost. Accordingly, total ownership cost issues are "dovetailed" into the systems engineering process.

Figure 5:
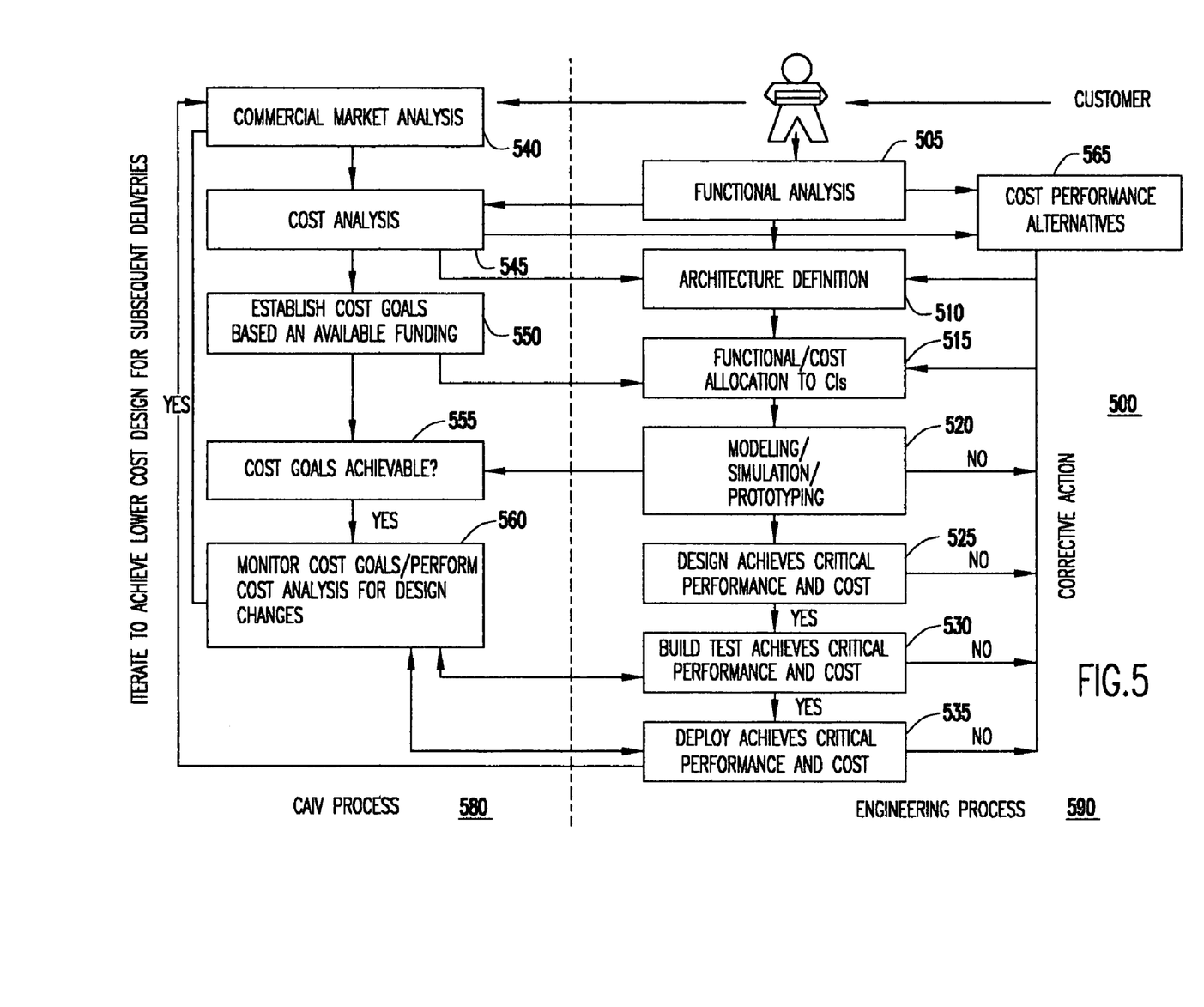
FIG. 5 illustrates an operation of a cost-as-an-independent-variable process according to one embodiment of the present invention.

FIG. 5 illustrates an operation 500 of total ownership cost assessment tool 210 in operation according to this CAIV methodology. This operation 500 is described in terms of an engineering process 590 and a CAIV process 580.

Engineering process 590 follows conventional systems engineering processes other than for the information it receives from CAIV process. Engineering process 590 is now described. In a step 505, functional analysis of the complex system is defined in accordance with system specifications provided by a customer. In a step 510, based on the functional analysis, an architecture definition is defined that provides the requisite functions to meet the system specifications. In a preferred embodiment of the present invention, OSA (Open Scripting/System Architecture) standards are selected as part of the architecture definition.

In a step 515, a functional requirements and costs are allocated and potentially updated in an evolutionary manner to constituent elements (e.g., Configuration Item, "CIs") in the complex system.

In a step 520, modeling, simulation and prototyping are carried out based on the architecture definition. If any of these operations reveal a flaw in the design, corrective action is taken and various cost performance alternatives are evaluated in a step 565. In a preferred embodiment of the present invention, COTS products are selected and configuration management begins.

In a step 525, the design is evaluated to determine whether it achieves critical performance and cost. If not, corrective action is taken and various cost performance alternatives are evaluated in step 565.

In step 530, a build test of the design is evaluated to determine whether it achieves critical performance and cost. If not, corrective action is taken and various cost performance alternatives are evaluated in step 565. In a preferred embodiment of the present invention, adherence to established OSA standards begins.

In a step 535, a deployment of design is evaluated to determine whether it achieves critical performance and cost. If not, corrective action is taken and various cost performance alternatives are evaluated in step 565. In a preferred embodiment of the present invention, "hot box testing" is initiated to validate correct system configuration.

According to the present invention, the operations of engineering process 590 are integrated with CAN process 580. In a step 540, a commercial market analysis is performed based on the system specifications provided by the customer. This analysis produces technology performance information required to assess the applicability of the product as a candidate solution.

In a step 545, a cost analysis is performed based on the commercial market analysis as well as the functional analysis determined in step 505. This cost analysis is utilized in step 565 to evaluate costs performance alternatives. This cost analysis is also utilized in architecture definition of step 510 to assist in selecting appropriate components for the complex system In a step 550, cost goals are established based on the cost analysis and an assessment of the funding available for the project. The cost goals are utilized in step 515 to allocate costs for the project to implement various functional requirements.

In a step 555, a determination is made whether the cost goals are achievable. This determination is preferably made based on the modeling, simulating and prototyping of step 520.

In a step 560, if the cost goals are determined achievable, the cost goals are monitored. In addition, subsequent cost analyses are performed for design changes to the complex system. Specifically, the build test and deployment are monitored to ensure that critical performance is met by the complex system while meeting the cost goals. In order to properly monitor the cost goals, commercial market analyses are performed to ensure accurate and up-to-date costs information.

Once the complex system is deployed in step 535, CAIV process 580 is iterated to achieve lower costs for subsequent deliveries or system enhancements.

According to a preferred embodiment of the present invention, CAIV process 580 and engineering process 590 are performed within multi-disciplinary environment 200 in conjunction with total ownership cost assessment tool 210. All information gathered and determined by these processes is preferably updated and reflected in information model 150.

System Implementation

In a preferred embodiment of the present invention, COTS products are used for many of the tools in multi-disciplinary environment 100. In particular, multi-disciplinary environment 100 is built on a layered software architecture using a COTS database management system (DBMS) that provides standard database management system services and a COTS PDM system that augments the DBMS with engineering specific information management capabilities. These capabilities include product data management, document management, configuration management, and workflow management.

In one embodiment of the present invention, a custom developed software framework provides an extensible infrastructure for interfacing engineering applications into PDM 130 and provides a standard application programming interface (API) for engineering application interfaces not traditionally supported by the vendor of PDM 130. In addition, the software framework provides an opportunity for managing information model 150 for both the information management system (PDM) and its interfacing applications.

In a preferred embodiment of the present invention, PDM 130 is implemented using Parametric Technology Corporation's Windchill™ to provide PDM capabilities targeting production deployment. Windchill is built on Oracle® 8, and provides an out-of-the-box persistence infrastructure that obviates the need to customize software. Windchill incorporates Rational Rose as a modeling tool, and augments Rose's native code generation capability to generate a significant amount of Windchill-specific Java software as well as the database schema for information model 150. Windchill's architecture is web-centric. This facilitates sharing of information among distributed sites (such as customers and contractors) and requires no special client software installation beyond a web browser. Windchill is also extensible; it provides an extensive Java class library as a foundation for custom development. Windchill includes, for example, a product model "part" class with basic functions and a graphical user interface. While extending the "part" class to support attributes required by total ownership cost assessment tool 210 still requires custom development, the necessary Java class library may be used as a foundation, and the final customized extended "part" class fits well within the well-defined Windchill framework.

Information model 150 is preferably developed by an integrated team of system and software engineers, cost engineers, hardware engineers and program managers using an Object-Oriented (OO) analysis process to specify the requirements associated therewith. Preferably, a Catalysis OO analysis methodology is applied to specify requirements for the complex system. Among other things, Catalysis extends the Object Modeling Technique (OMT) with a rigorous specification of the behaviors of the complex system being modeled. These techniques are generally well known.

In one embodiment of the present invention, a Rational Rose toolset is used to capture and document the requirements using both a Unified Modeling Language (UML) and an Object Constraint Language (OCL). These requirements are mapped into information model 150 and utilized to build the software product model framework and custom applications.

In an alternate embodiment of the present invention, Computervision Optegra™ provides the capabilities of PDM 130. Optegra is built on top of the Oracle® 7 Relational Database Management System (RDBMS). Information model 150 is built within Optegra using the Computervision Locator client. While configurations may also be specified using Locator, a streamlined technique using Microsoft Excel is preferably implemented to specify the physical structure, components, and associated attributes of a configuration and to export a text file that may be imported into Optegra.

In an alternate embodiment of the present invention, total ownership cost assessment tool 210 is implemented in one or more Microsoft Excel spreadsheets. However, this embodiment lacks scalability and flexibility as well as results in a labor-intensive process to coordinate cost impact assessments of design tradeoffs.

In one embodiment of the present invention, Microsoft Access is tailored to include a user interface for migrating information from PDM 130 for importing the files into Access, and for producing the corresponding report in a structured format.

While the present invention has been described in terms of a preferred embodiment, other embodiments and variations are within the scope of the following claims.

What is claimed is:

1. A method for determining, using at least one processor in a computer system, a total ownership cost associated with a complex system, said method comprising:

receiving, at a total ownership cost assessment tool which is implemented in said at least one processor, an aspect of system context from an information model representing the complex system, wherein said system context includes one or more of a functional context, a physical context, an operational context and an infrastructure context, wherein said information model representing the complex system is generated by and maintained in a multi-disciplinary environment comprising a plurality of networked computers;

receiving, at said total ownership cost assessment tool, an aspect of schedule context from said information model representing the complex system, said schedule context being mapped to one or more contexts included in said system context to provide a timeline of evolutions of said contexts through the life cycle of said complex system, said aspect of schedule context being related to said aspect of system context; and determining, by said at least one processor, the total ownership cost of the complex system based on said aspect of system context and said aspect of schedule context, wherein said step of determining the total ownership cost further comprises:

processing said aspect of system context and said aspect of schedule context from said information model representing the complex system by said total ownership cost assessment tool, and calculating, from said aspect of system context and said aspect of schedule context, in accordance with a cost projection function wherein said cost projection function includes cost curves representing a cost associated with a technology performance parameter over time and an inflation driven cost index as a multiplier of a reference cost of said aspect of said complex system at a reference time, by said total ownership cost assessment tool, the total ownership cost associated with said complex system over a period of time in accordance with said aspect of said schedule context whereby a parameter of a project phase of said complex system is determined based on said total ownership cost determined in said step of determining the total ownership cost.

2. The method of claim 1, further comprising receiving an aspect of infrastructure context from said information model representing the complex system, said aspect of infrastructure context being related to one of said aspect of system context and said aspect of schedule context.

3. The method of claim 1, wherein said receiving an aspect of system context comprises receiving an aspect of functional context from said information model representing the complex system.

4. The method of claim 3, wherein said receiving an aspect of system context further comprises receiving an aspect of physical context from said information model representing the complex system.

5. The method of claim 4, wherein said receiving an aspect of system context further comprises receiving an aspect of operational context from said information model representing the complex system.

6. The method of claim 1, wherein said receiving an aspect of system context comprises receiving an aspect of operational context from said information model representing the complex system.

7. The method of claim 1, wherein said receiving an aspect of system context comprises receiving an aspect of physical context from said information model representing the complex system.

8. The method of claim 1, wherein said receiving an aspect of schedule context comprises receiving a development schedule from said information model representing the complex system.

9. The method of claim 1, wherein said receiving an aspect of schedule context comprises receiving a production schedule from said information model representing the complex system.

10. The method of claim 1, wherein said receiving an aspect of schedule context comprises receiving a technology refreshment schedule from said information model representing the complex system.

11. The method as recited in claim 1, wherein the multi-disciplinary environment comprises at least two tools and processes selected from the group consisting of document, authoring, view and markup tools, SGML authoring tools, systems engineering tools, software analysis and development tools, automated assembly program development tools, computer aided design (CAD) tools, SGML data managers, software configuration management tools, automated assembly data managers, structural analysis tools, CAD data managers, component/supplier managers, program manager's tool kit with data warehouse, legacy data systems, automated assembly systems, enterprise resource planning (ERP), manufacturing planning development tools, logistics support analysis data bases, reliability, maintainability, supportability tools, and provisioning tools, electronic commerce gateway, firewall and web interface; and human resources.

12. A non-transitory computer readable medium having computer readable program code embodied in said medium for causing a computer to perform a method for estimating a total ownership cost associated with a complex system, said method comprising steps of:

in accordance with first computer readable program code, receiving, at a total ownership cost assessment tool which is implemented in said at least one processor, an aspect of system context from an information model representing the complex system, wherein said system context includes one or more of a functional context, a physical context, an operational context and an infrastructure context, wherein said information model representing the complex system is generated by and maintained in a multi-disciplinary environment comprising a plurality of networked computers;

in accordance with second computer readable program code, receiving, at said total ownership cost assessment tool, an aspect of schedule context from said information model representing the complex system, said schedule context being mapped to one or more contexts included in said system context to provide a timeline of evolutions of said contexts through the life cycle of said complex system, said aspect of schedule context being related to said aspect of system context; and in accordance with third computer readable program code, determining, by said at least one processor, the total ownership cost of the complex system based on said aspect of system context and said aspect of schedule context, wherein said step of determining the total ownership cost further comprises:

processing said aspect of system context and said aspect of schedule context from said information model representing the complex system by said total ownership cost assessment tool, and calculating, from said aspect of system context and said aspect of schedule context, in accordance with a cost projection function wherein said cost projection function includes cost curves representing a cost associated with a technology performance parameter over time and an inflation driven cost index as a multiplier of a reference cost of said aspect of said complex system at a reference time, by said total ownership cost assessment tool, the total ownership cost associated with said complex system over a period of time in accordance with said aspect of said schedule context whereby a parameter of a project phase of said complex system is determined based on said total ownership cost determined in said step of determining the total ownership cost.

13. The computer program product of claim 12, further comprising fourth computer readable program code for enabling the computer system to receive an aspect of infrastructure context from said information model representing the complex system, said aspect of infrastructure context related to one of said aspect of system context and said aspect of schedule context.

14. The computer program product of claim 12, wherein said first computer readable program code comprises computer readable program code for enabling the computer system to receive an aspect of functional context from said information model representing the complex system.

15. The computer program product of claim 12, wherein said first computer readable program code comprises computer readable program code for enabling the computer system to receive an aspect of physical context from said information model representing the complex system.

16. The computer program product of claim 12, wherein said first computer readable program code comprises computer readable program code for enabling the computer system to receive an aspect of operational context from said information model representing the complex system.

17. The computer program product as recited in claim 12, wherein the multi-disciplinary environment comprises at least two tools and processes selected from the group consisting of document, authoring, view and markup tools, SGML authoring tools, systems engineering tools, software analysis and development tools, automated assembly program development tools, computer aided design (CAD) tools, SGML data managers, software configuration management tools, automated assembly data managers, structural analysis tools, CAD data managers, component/supplier managers, program manager's tool kit with data warehouse, legacy data systems, automated assembly systems, enterprise resource planning (ERP), manufacturing planning development tools, logistics support analysis data bases, reliability, maintainability, supportability tools, and provisioning tools, electronic commerce gateway, firewall and web interface; and human resources.

18. A system for determining a total ownership cost associated with a complex system comprising:
at least one tool comprising at least one processor configured to gather information regarding the complex system;
a product data manager tool implemented by the at least one processor and coupled to a multi-disciplinary environment comprising a plurality of networked computers, wherein said at least one processor is configured to organize the information gathered by said at least one tool as an information model representing the complex system; and
a total ownership cost assessment tool implemented by at least one processor coupled to said product data manager means and configured to receive an aspect of system context including one or more of a functional context, a physical context, an operational context and an infrastructure context and an aspect of schedule context from said information model representing the complex system, said schedule context being mapped to contexts included in said system context to provide a timeline of evolutions of said contexts included in said system context through the life cycle of said complex system, said at least one processor implementing said total ownership cost assessment tool is further configured to process said aspect of system context and said aspect of schedule context and calculate the total ownership cost associated with the complex system based on said aspect of system context and said aspect of schedule context in accordance with a cost projection function including cost curves representing a cost associated with a technology performance parameter over time and an inflation driven cost index as a multiplier of a reference cost of said aspect of said complex system at a reference time over a period of time in accordance with said aspect of said schedule context, wherein said aspect of system context is related to said aspect of schedule context.

19. The system of claim 18, wherein said aspect of system context is an aspect of functional context.

20. The system of claim 18, wherein said aspect of system context is an aspect of physical context.

21. The system of claim 18, wherein said aspect of system context is an aspect of operational context.

22. The system of claim 18, wherein said total cost assessment tool extracts an aspect of infrastructure context from said information model representing the complex system, said aspect of infrastructure context being related to one of said aspect of system context and said aspect of schedule context.

23. The system as recited in claim 18, wherein the multi-disciplinary environment comprises at least two tools and processes selected from the group consisting of document, authoring, view and markup tools, SGML authoring tools, systems engineering tools, software analysis and development tools, automated assembly program development tools, computer aided design (CAD) tools, SGML data managers, software configuration management tools, automated assembly data managers, structural analysis tools, CAD data managers, component/supplier managers, program manager's tool kit with data warehouse, legacy data systems, automated assembly systems, enterprise resource planning (ERP), manufacturing planning development tools, logistics support analysis data bases, reliability, maintainability, supportability tools, and provisioning tools, electronic commerce gateway, firewall and web interface; and human resources.

24. The system as recited in claim 18, wherein the total ownership cost assessment tool utilizes a cost estimating engine having inputs selected from the group consisting of technology trends and market analysis, projected change, system baseline interrelationships, non-baseline system interrelationships, system availability schedules, spares/repairs baseline, and system configuration, and wherein the cost estimating engine produces at least one output selected from the group consisting of development costs, production costs, through-life costs, qualitative impact assessments, and trade study and sensitivity analysis.

25. A method for determining a system life cycle parameter associated with a complex system, said method comprising:
receiving, at a total cost assessment tool which is implemented in at least one processor, an aspect of system context from an information model representing the complex system, wherein said information model representing the complex system is generated by and maintained in a multi-disciplinary environment comprising a plurality of networked computers, said system context including at least one of a functional context, a physical context, and a operational context;
receiving, at said total ownership cost assessment tool, an aspect of schedule context from said information model representing the complex system, said schedule context being mapped to one or more contexts included in said system context to provide a timeline of evolutions of said system context through the life cycle of said complex system, said aspect of schedule context being related to said aspect of system context;
receiving, at said total ownership cost assessment tool, an aspect of infrastructure context from said information model representing the complex system, said aspect of infrastructure context being related to said aspect of system context and said aspect of schedule context; and
determining, by said at least one processor, the system life cycle parameter associated with the complex system based on said aspect of system context, said aspect of schedule context, and said aspect of infrastructure context,
wherein said step of determining further comprises
processing said aspect of system context, said aspect of schedule context and said aspect of infrastructure context from said information model representing the complex system by said total ownership cost assessment tool, and
calculating, from said aspect of system context, said aspect of schedule context and said aspect of infrastructure context, in accordance with a cost projection function including cost curves representing a cost associated with a technology performance parameter over time and an inflation driven cost index as a multiplier of a reference cost of said aspect of said complex system at a reference time, by said total ownership cost assessment tool, the total ownership cost associated with said complex system over a period of time in accordance with said aspect of said schedule context whereby a parameter of a project phase of said complex system is determined based on said total ownership cost determined in said determining step.

26. The method of claim 25, wherein said system life cycle parameter is a hardware procurement cost associated with a particular configuration of the complex system.

27. The method of claim 25, wherein said system life cycle parameter is a hardware procurement cost associated with a particular configuration of a subsystem within the complex system.

28. The method of claim 25, wherein said system life cycle parameter is a hardware spares/repairs cost associated with a particular configuration of the complex system.

29. The method of claim 25, wherein said system life cycle parameter is a hardware spares/repairs cost associated with a particular configuration of a subsystem within the complex system.

30. The method of claim 25, wherein said system life cycle parameter is a costing difference between two configurations of the complex system.

31. The method of claim 30, wherein said system life cycle parameter is a hardware procurement costing difference between two configurations of the complex system.

32. The method of claim 30, wherein said system life cycle parameter is a hardware spares/repairs costing difference between two configurations of the complex system.

33. The method as recited in claim 25, wherein the multi-disciplinary environment comprises at least two tools and processes selected from the group consisting of document, authoring, view and markup tools, SGML authoring tools, systems engineering tools, software analysis and development tools, automated assembly program development tools, computer aided design (CAD) tools, SGML data managers, software configuration management tools, automated assembly data managers, structural analysis tools, CAD data managers, component/supplier managers, program manager's tool kit with data warehouse, legacy data systems, automated assembly systems, enterprise resource planning (ERP), manufacturing planning development tools, logistics 29, wherein the multi-disciplinary environment comprises at least two tools and processes selected from the group of document, authoring, view and markup tools, SGML authoring tools, systems engineering tools, software analysis and development tools, automated assembly program development tools, computer aided design (CAD) tools, SGML data managers, software configuration management tools, automated assembly data managers, structural analysis support analysis data bases, reliability, maintainability, supportability tools, and provisioning tools, electronic commerce gateway, firewall and web interface; and human resources.

34. A method for determining a total ownership cost associated with a component of a complex system using at least one processor in a computer system, said method comprising:

receiving, at a total ownership cost assessment tool which is implemented in said at least one processor, an aspect of system context corresponding to said component of said complex system from an information model representing the complex system, said system context including one or more of a functional context, a physical context, an operational context and an infrastructure context, wherein said information model representing the complex system is maintained in a multi-disciplinary environment comprising a plurality of networked computers;

receiving, at said total ownership cost assessment tool, an aspect of schedule context from said information model representing the complex system, said schedule context being mapped to one or more contexts included in said system context to provide a timeline of evolutions of said contexts through the life cycle of said complex system, said aspect of schedule context being related to said aspect of system context; and determining, by said at least one processor, the total ownership cost with respect to said aspect of system context and said aspect of schedule context for the component of the complex system, wherein said step of determining the total ownership cost further comprises:

processing said aspect of system context and said aspect of schedule context from said information model representing the complex system by said total ownership cost assessment tool, and calculating, from said aspect of system context and said aspect of schedule context, in accordance with a cost projection function including cost curves representing a cost associated with a technology performance parameter over time and an inflation driven cost index as a multiplier of a reference cost of said aspect of said complex system at a reference time, by said total ownership cost assessment tool, over a period of time in accordance with said aspect of said schedule context whereby a parameter of a project phase of said complex system is determined based on said total ownership cost determined in said step of determining the total ownership cost.

35. The method of claim 30, wherein said system life cycle parameter is hardware spares/repairs costing difference between a first configuration and a second configuration of the complex system.

36. The method as recited in claim 34, wherein the multi-disciplinary environment comprises at least two tools and processes selected from the group consisting of document, authoring, view and markup tools, SGML authoring tools, systems engineering tools, software analysis and development tools, automated assembly program development tools, computer aided design (CAD) tools, SGML data managers, software configuration management tools, automated assembly data managers, structural analysis tools, CAD data managers, component/supplier managers, program manager's tool kit with data warehouse, legacy data systems, automated assembly systems, enterprise resource planning (ERP), manufacturing planning development tools, logistics support analysis data bases, reliability, maintainability, supportability tools, and provisioning tools, electronic commerce gateway, firewall and web interface; and human resources.

* * * * *